Dec. 9, 1930.  L. A. MOFFET  1,784,243
SPRAYING DEVICE
Filed April 11, 1929
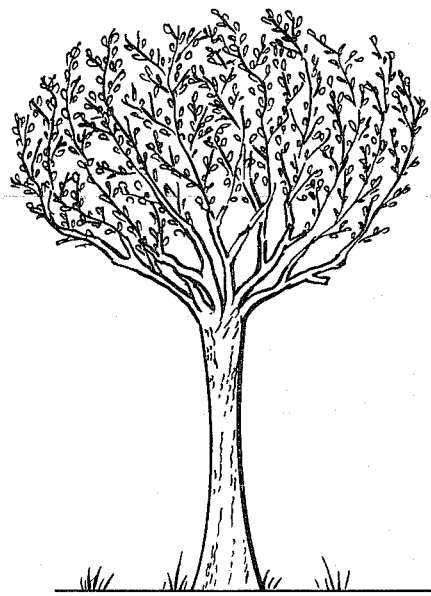
Fig.1.
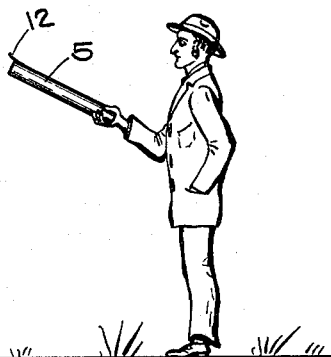
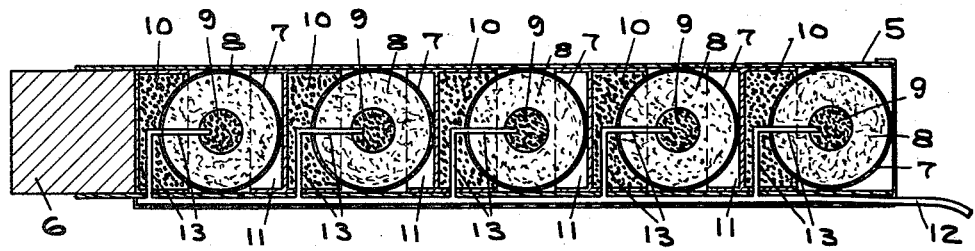
Fig.2.
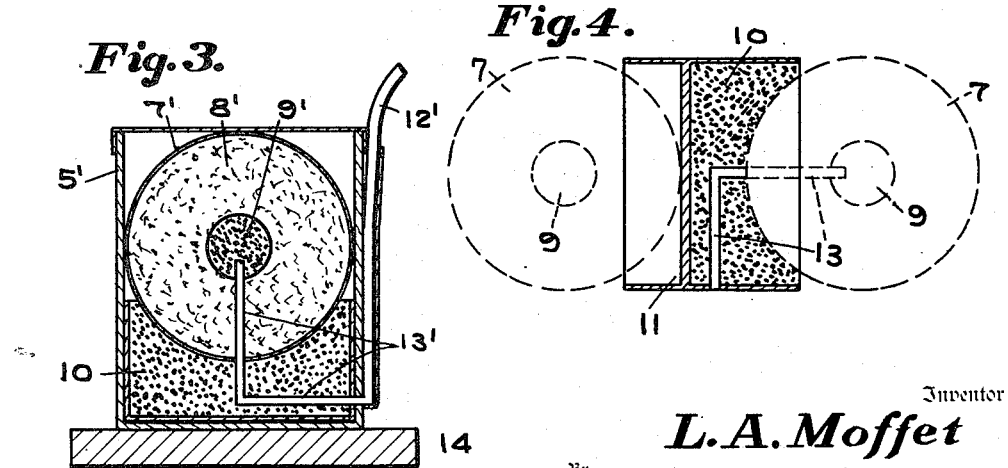
Fig.3.  Fig.4.
Inventor
L. A. Moffet
By Hiram A. Sturges
Attorney Patented Dec. 9, 1930

1,784,243

UNITED STATES PATENT OFFICE

LLOYD A. MOFFET, OF FREMONT, NEBRASKA

SPRAYING DEVICE

Application filed April 11, 1929. Serial No. 354,402.

This invention relates to a spraying device adapted to be used by those engaged in the growing of fruits or flowers. In the work of fruit raising it is now considered necessary that three applications of spray-dust be made each season, once at the time the buds are in bloom, once a short time later when the blossoms have disappeared, and once thereafter.

In the work of spraying, the material now used has the consistency of dry dust. It is generally delivered or applied to the buds or blossoms by compressed air fuses, and since the spraying material is comparatively light in weight and finely divided it may be delivered to the top most branches of fruit trees and will adhere to all substances with which it contacts.

However, it is well known that the present method of dust-spraying has some objectionable features. The machines required are of expensive construction and are slow in operation. One of the objects of the invention is to provide a spraying device of such arrangement that the spray-dust may be thrown in the form of balls from a hand-tube and will be distributed to the foliage of the tree uniformly and effectively by the bursting of the balls in the presence of the foliage in the tree tops.

One of the objects of the invention is to provide a spraying device of such construction that it may be manufactured at a very limited expense and therefore may be used to advantage by the owners of small orchards.

Another object of the invention is to provide a spraying device by use of which large orchards may be treated without undue loss of time. The invention includes a hand-tube adapted to contain and to discharge a plurality of dust balls for spraying the foliage of a tree, and also includes the use of a large single ball adapted to be disposed in a tree top and to be discharged for the same purpose, and thereby effecting a saving in time in instances where large orchards are to be sprayed.

With the foregoing objects in view and others to be mentioned, the invention presents a new and useful construction, combination and arrangement of parts as described herein and claimed, and as illustrated in the accompanying drawing, it being understood that changes may be made in form, size, proportion and minor details, said changes being within the scope of the invention as claimed.

In the drawing, Figure 1 is a view illustrating one of the methods of use of the spraying-device. Figure 2 is a view in longitudinal section through a spraying device. Figure 3 is a view in longitudinal section through a spraying device containing a comparatively large ball. Figure 4 is a sectional view through a stabilizing portion, being a detail relating to Figure 2.

Referring now to the drawing, and more particularly to Figure 2 thereof for a complete description of the invention, I provide a tube 5 open at one of its ends, its opposite end being provided with a handle 6. This tube may be constructed of any suitable material, but non-ignitible paper is preferred, and it may have any suitable length sufficient to contain a desired number of balls 7. These balls, for convenience, are called dust-balls, that is to say, they contain material or ingredients 8 generally used by nursery men for "spraying" the blossoms and buds of fruit trees. The contents of each ball is comparatively light in weight; also it is dry and of exceeding fineness and when released from the ball-cover readily becomes mixed with the surrounding air.

The covers for the balls may consist of any suitable non-ignitible fabric such as paper or other similar material. Numerals 9 indicate explosive material which is disposed centrally of each ball and centrally of the ingredients 8.

Numerals 10 indicate explosive material, each element 10 being disposed immediately at the rear of a ball, and at 11 are indicated discs or partitions which are disposed rearwardly of each explosive element 10.

Since fuses may burn rapidly or slowly, according to the kinds of fuses to be used, they operate to advantage in connection with the present invention. Numeral 12 indicates a main fuse which extends the entire length of the tube 5, and numeral 13 indicates branches or secondary fuses which burn more rapidly than the fuse 12. Said branches 13 extending from the fuse 12 through the explosive element 10, and from thence through the covering of a ball to a communication with the explosive element 9 centrally of a ball 7.

In operation, the tube 5 may be held as shown in Figure 1 of the drawing and an operator may control the direction of movement of the balls which are discharged from the tube so that the spraying will be effective.

It will be understood that the free end of the fuse 12, when ignited, will burn rearwardly and that the secondary fuse or branch 13 will become ignited and the resulting explosion of the material 10 will cause the first ball or that ball nearest the free end of the tube to be discharged. This ball will enter the foliage of the tree and at that instant the explosive 9 centrally of said ball will become ignited to cause a release of the spray-powder or dust 8 which operates to spray the blossoms or buds. The timing of the fuses is depended upon for this purpose, that is to say, the fuse 13 burns faster than the fuse 12.

In instances where a plurality of balls 7 is used for a tube 5 the fuse 12 burns slowly so that the intervals for discharging the balls will be approximately 10 seconds apart which permits an operator to direct the discharge to advantage. However, the intervals of time between the discharge of the balls may be varied. After each ball is discharged from the tube the explosive 9 should be ignited about one second later, this last named ignition occurring at the instant the ball reaches the blossoms or buds to be sprayed. However, if the trees are of large size more than a single second may be required before ignition of the element 9, and as before stated, the fuses 13 may be timed to permit ignition of elements 9 at suitable intervals of time after ignition of elements 10 occur, depending upon conditions and upon the distance the balls 7 travel for reaching the blossoms or buds.

The discs or caps 11 operate to stabilize the several balls and explosive elements. However, it will be appreciated that only a slight force will be required for discharging a ball from the tube 5 and causing it to move the few feet required for operation.

Figure 3 illustrates a short tube 5' provided with a base 14 and adapted to contain a comparatively large ball 7'. A main fuse 12' is provided, and a branch fuse 13' leads from the main fuse 12' to the explosive core 9'. This ball 7' may be of such proportions that the spray-dust will be sufficient for all of the blossoms of a tree. Since operation is the same for its several parts as already described, the disclosure shown for this single structure is believed to be within the scope of the invention. The single large ball thus shown requires no particular description since operation will be understood. It is of advantage in instances where large orchards are to be sprayed. The construction shown in Fig. 2 of the drawing is particularly of advantage in instances where single trees or a few trees are required to be sprayed. However in all instances the spraying devices require no expensive machinery for operation, and by use of the herein described spraying devices the work may be speedily accomplished at a very limited expense.

I claim as my invention:—

1. An improved spraying device comprising a tube, a partition in said tube, a projectile containing spraying material mounted in said tube and being separate and distinct from said partition, and a charge of explosive propulsive material mounted between said projectile and said partition.

2. An improved spraying device comprising a tube, a cup-shaped partition mounted in said tube, a charge of explosive propulsive material mounted in the cupped portion of said partition, and a projectile containing spraying material independent of said partition mounted in the tube and against the explosive material.

3. An improved spraying device comprising an elongated tube, a plurality of partitions mounted in said tube, said partitions having flanges extending in opposite directions, charges of explosive propulsive material lodged in the flanges at one side of the several partitions, spherical projectiles mounted in said tube between the partition and received at one side against the explosive material and at the other side within the opposite flanges of the partitions, spraying material contained in said projectile, a central explosive charge contained also in said projectile, a fuse extending in common to all of the projectiles longitudinally within the tube, and short individual fast burning fuses connected with said first named fuse and extending into the projectiles and to the explosive charges therein.

In testimony whereof, I have affixed my signature.

LLOYD A. MOFFET.